United States Patent
Graham

(10) Patent No.: US 11,308,267 B1
(45) Date of Patent: Apr. 19, 2022

(54) ARTIFACTS REFERENCE CREATION AND DEPENDENCY TRACKING

(71) Applicant: UiPath Inc., New York, NY (US)

(72) Inventor: Bridgette Graham, Gauteng (ZA)

(73) Assignee: UIPATH, INC., New York, NY (US)

(*) Notice: Subject to any disclaimer, the term of this patent is extended or adjusted under 35 U.S.C. 154(b) by 0 days.

(21) Appl. No.: 17/032,990

(22) Filed: Sep. 25, 2020

(51) Int. Cl.
*G06F 17/10* (2006.01)
*G06F 40/174* (2020.01)
*G06F 40/103* (2020.01)
*G06F 8/40* (2018.01)

(52) U.S. Cl.
CPC ............. *G06F 40/174* (2020.01); *G06F 8/40* (2013.01); *G06F 40/103* (2020.01)

(58) Field of Classification Search
CPC ......... G06F 40/174; G06F 40/103; G06F 8/40
See application file for complete search history.

(56) References Cited

U.S. PATENT DOCUMENTS

| | | | |
|---|---|---|---|
| 6,185,583 B1* | 2/2001 | Blando | G06F 40/174 715/260 |
| 7,096,425 B1* | 8/2006 | Takahashi | G06F 40/174 715/222 |
| 7,363,633 B1 | 4/2008 | Goldick et al. | |
| 7,730,410 B2 | 6/2010 | Goering et al. | |
| 8,392,873 B2* | 3/2013 | Agrawal | G06F 8/20 717/106 |
| 9,342,273 B1 | 5/2016 | Kumar et al. | |
| 9,996,330 B2* | 6/2018 | Bregler | G06F 9/44521 |
| 10,216,513 B2 | 2/2019 | Alabes et al. | |
| 2003/0070061 A1 | 4/2003 | Wong et al. | |
| 2006/0101051 A1* | 5/2006 | Carr | G06F 40/174 707/999.102 |
| 2010/0077386 A1 | 3/2010 | Akkiraju et al. | |
| 2011/0271173 A1* | 11/2011 | Ait-Mokhtar | G06F 40/174 715/226 |
| 2013/0086462 A1* | 4/2013 | De Cerqueira Gatti | G06F 16/88 715/222 |
| 2016/0012015 A1* | 1/2016 | Tran | H04N 1/00241 715/221 |
| 2016/0117293 A1* | 4/2016 | Dettman | G06F 40/143 715/234 |
| 2016/0212011 A1 | 7/2016 | Bemabeu-Auban et al. | |
| 2017/0372247 A1* | 12/2017 | Tauber | G06F 8/71 |
| 2018/0018676 A1* | 1/2018 | Mukherjee | G06Q 10/10 |
| 2018/0074815 A1* | 3/2018 | Alabes | G06F 9/44526 |

(Continued)

FOREIGN PATENT DOCUMENTS

CN 109032699 A 12/2018

*Primary Examiner* — Shahid K Khan
(74) *Attorney, Agent, or Firm* — Volpe Koenig

(57) ABSTRACT

A computing device includes a processor and a memory configured to create one or more forms for an application in an environment. The processor and the memory are further configured to create one or more environment variables related to the one or more forms. The processor is further configured to utilize one or more paths to track a dependency reference between the one or more environment variables, wherein a data model includes the one or more paths and the one or more environment variables. The processor is further configured to execute the data model to recreate the dependency reference, between the one or more environment variables, for the application in a target environment.

20 Claims, 5 Drawing Sheets

(56) References Cited

U.S. PATENT DOCUMENTS

| | | | |
|---|---|---|---|
| 2018/0095942 A1* | 4/2018 | Singh | G06F 40/143 |
| 2019/0034181 A1 | 1/2019 | Kapoor et al. | |
| 2019/0129712 A1 | 5/2019 | Hawrylo et al. | |
| 2020/0142953 A1* | 5/2020 | Chauhan | G06F 40/154 |

* cited by examiner

ARTIFACTS REFERENCE CREATION AND DEPENDENCY TRACKING

BACKGROUND

Robotic process automation (RPA) may automate processes, operations, functions, components, tasks, or workflows on enterprise platforms, virtual machines (VMs), remote desktops, applications on the cloud, desktop applications, mobile applications, or the like by utilizing one or more robots. A robot may be a software robot, process, package, RPA process, RPA package, RPA robot, a workflow of a package, sub-process, micro-bot, module, or the like. Applications related to a robot or RPA may be programmed, coded, built, or designed in different development or computing environments.

Reusing applications for varying implementations or different computing environments may require managing artifacts for proper operation. During deployment or upload of an application in a new environment, artifacts associated with the application may be utilized for delivering the intended function or operation of the application. Understanding the operation, relationship, properties, or interaction of different artifacts for an application to function properly in a new environment may create system inefficiencies, waste resources, or increase overhead. In addition, unexpected behavior or severe errors that render an application unusable may occur without the proper setup of artifacts in a new computing environment. Thus, it is desirable to manage artifacts to reuse applications for varying implementations or different computing environments.

SUMMARY

Environment variables or parameters may be created for forms related to an application. Paths may be configured or utilized to track a dependency that is referenced between the environment variables or parameters. The paths and environment variables or parameters may be part of a data model. The data model may recreate the dependency reference between environment variables for the application in other environments.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Although further detail will be provided below, generally a computing device includes a processor and a memory configured to create one or more forms for an application in an environment. The processor and the memory are further configured to create one or more environment variables related to the one or more forms. The processor is further configured to utilize one or more paths to track a dependency reference between the one or more environment variables, wherein a data model includes the one or more paths and the one or more environment variables. The processor is further configured to execute the data model to recreate the dependency reference, between the one or more environment variables, for the application in a target environment.

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
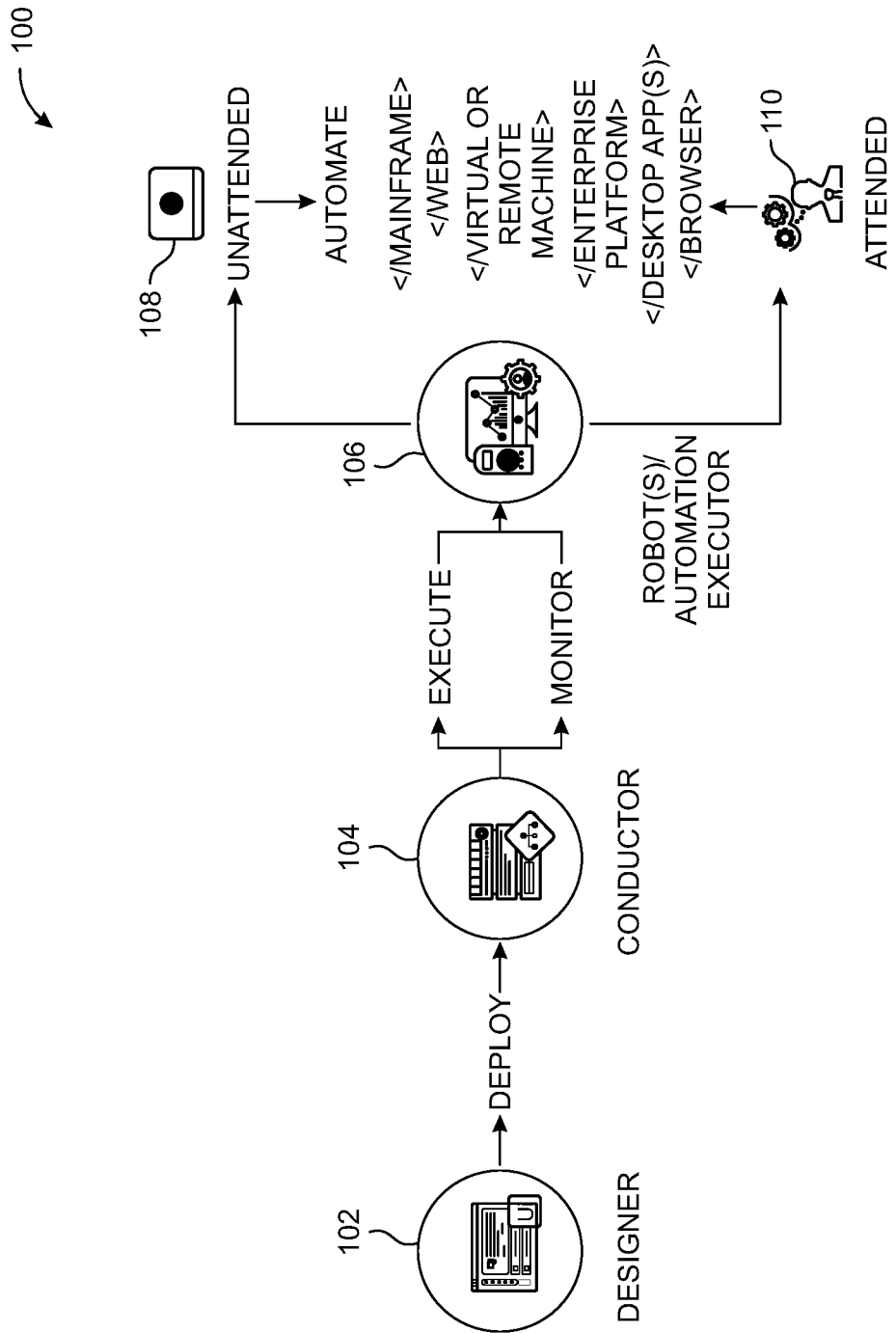
FIG. 1A is an illustration of robotic process automation (RPA) development, design, operation, or execution.

FIG. 1A is an illustration of robotic process automation (RPA) development, design, operation, or execution 100. Designer 102, sometimes referenced as a studio, development platform, development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
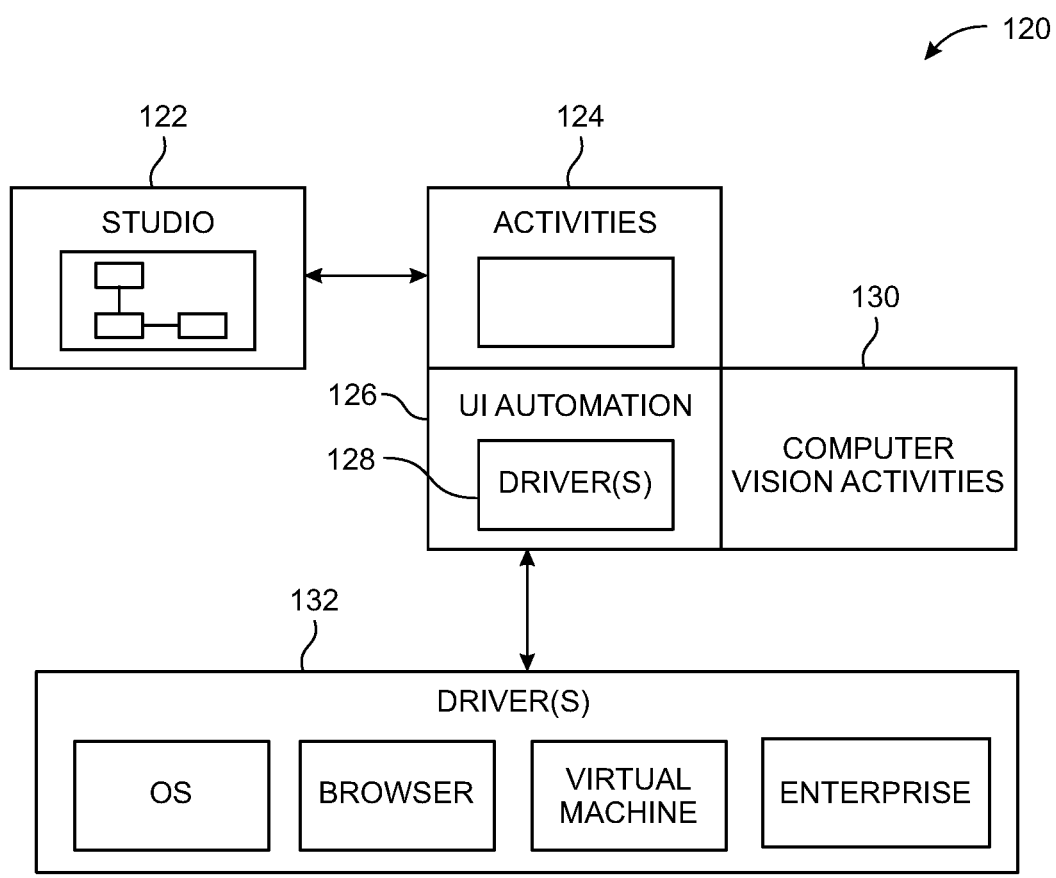
FIG. 1B is another illustration of RPA development, design, operation, or execution.
Figure 1C:
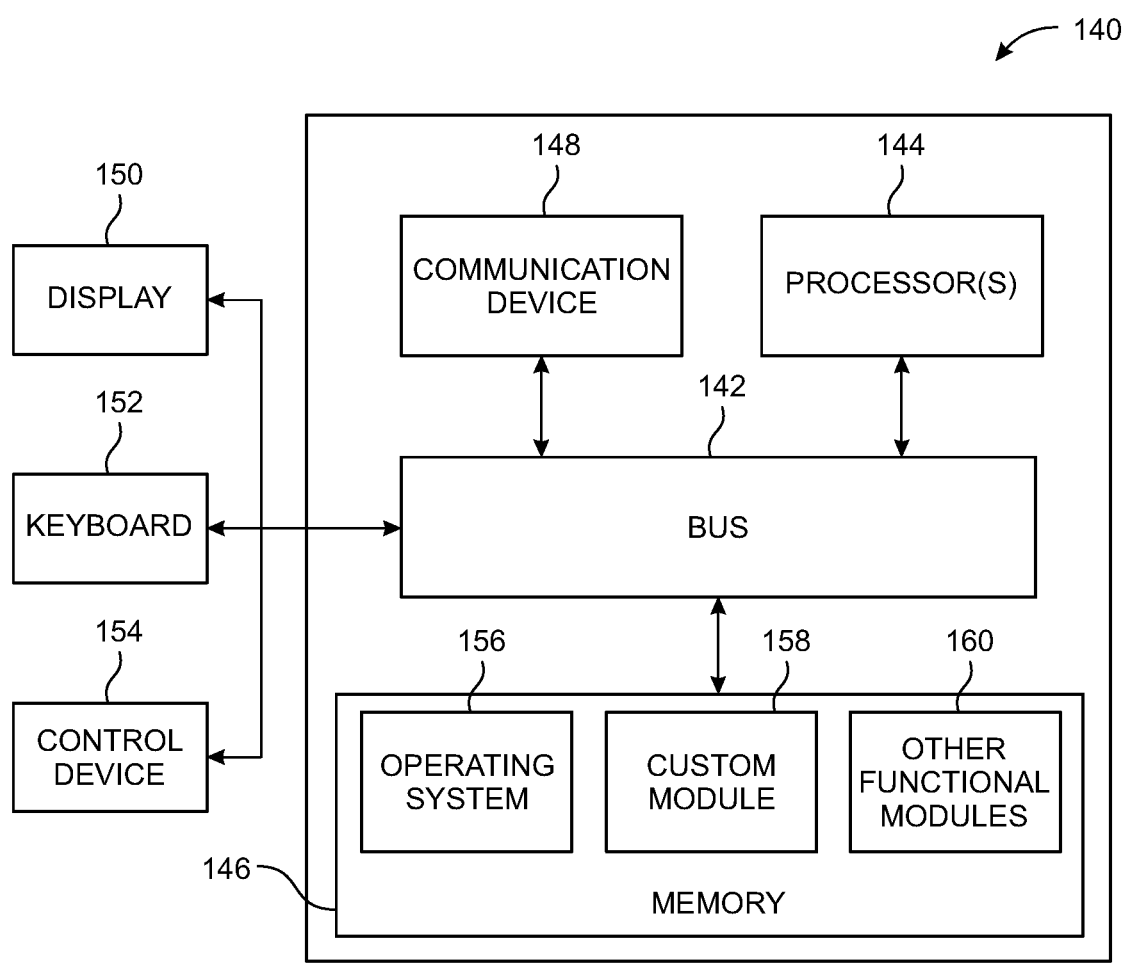
FIG. 1C is an illustration of a computing system or environment.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

FIG. 10 is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

In certain embodiments, a path may be created or configured for artifacts of an application. An artifact may be environment parameters or variables for an application. For example, an artifact may include a page of an application, a data source, an application variable or a button on a page or form.

In certain configurations, JavaScript Object Notation (JSON), JavaScript, typescript, or the like may be utilized to create or configure a path. In certain configurations, a JSON "string" path may be coded to locate artifacts or references to models, other models, forms, data sources, objects, sub-objects, properties, sub-properties, or the like in a JSON structure.

A path may also be utilized to track usage of models, other models, forms, data sources, objects, properties, or the like throughout an application. A path may function as a mapping between artifacts to understand application architecture for faster development or deployment. Artifact dependency tracking and paths may assist end users to understand an application architecture and how different components or modules of the application rely or depend on different components or modules. Paths or mappings may be utilized internally and externally of a computing environment.

For example, in this context, an internal reference may be a path inside a Form that points to a button inside the same form, with various places where that form refer to that button. An example of this would be a rule that enables or disables the button: the rule and the button exist in the same form, so tracking of this button and where it is used is "internal" to the form.

External references would be a path inside a Form that refers to a button on a different Form. As an example, Form A could have a Button1. Button1 could have a rule that instructs the application to show Form 2 when the user clicks on Button1. There is now a reference between Form1 and Form2 via the Rule on Button1. Form1 will have a reference to Form2, and Form2 would have a reference back to Form1 and Button1. These may be considered external paths as the path refers to an artefact/object that is defined outside of the Form itself.

A JSON path may be stored as a reference and point to the associated artifact, a shared artifact, object, environment variable, or the like that corresponds to the path. A system may utilize this configuration to retrieve required information of an application directly from the linked artifact, shared artifact, object, environment variable, or the like. The mapping and dependencies created through the JSON paths for an application may prevent data duplication, reduce unnecessary data transmission, improve bandwidth usage, decrease implementation time, increase system responsiveness, increase system performance, or the like.

When a JSON model, comprising paths and artifact references, is uploaded into a system, the JSON paths may automatically create or recreate relationships between one or more artifacts. These relationships may ensure that substantially all dependencies of the application can be automatically created on the target environment with minimal user input or intervention. Substantially all required artifacts and critical information may be contained in a JSON Object Model optimized for data or file size.

Rehydrating a designer or studio from a JSON model or data may create needed artifacts or dependencies for operation. That is, Rehydration is the process of taking data received from the backend, and re-creating in-memory objects (an object model) from the data received. During the rehydration process (reading the data into the model objects), references can be verified and checked to see if they are still valid. This process can alert the user of dependencies that might have been deleted, or of those are expected changes, simply update the underlying object model without the user knowing about it.

The JSON paths inside an object model may serve as pathways that reference the different artifacts and subsequently links them as dependencies. Definitions and metadata of additional, external dependencies may also be embedded within JSON models to enable deployment of the application in different environments. A model object or object model framework may be capable of understanding artifact paths and resolve or create required dependencies. A framework may automatically generate and link different objects and artifacts to ensure a substantially exact copy of the original application in different environments.

In certain configurations, environment variables or parameters may be artifacts created for forms related to an application. Paths may be configured or utilized to track a dependency reference between the environment variables or parameters. The paths and environment variables or parameters may be part of a data model such as a JSON model for the one or more forms. The data model may recreate the dependency reference between environment variables for the application in other environments for proper operation of the one or more forms.

During application programming, coding, building, design, or the like targeted artifacts may added, updated, altered, or the like to a JSON model as the application is configured to a particular specification. Configured paths or artifacts may be arranged in a tree or graph for different environments. This may assist in understanding the dependencies of artifacts, and related application architecture, through visualization. The JSON model may be reproduced instantly in a different environment to understand a dependency chain.

In certain configurations, an underlying model framework may be configured to manage artifacts. For RPA, an application may interface with a conductor or orchestrator using a container having definitions of and references to orchestrator instances. A form may be built interfacing to read/write to any data sources using an application programming interface (API). The API may be for programming for one or more databases. A button on the form may trigger a function for any data source. A button may comprise a list of items for tracking. A data source may be a table with data from Saleforce, SAP, or the like based sources. Artifacts related to the form may be configured to communicate information to one another without parsing substantially all models or definitions in order to generate a dependency graph.

In certain embodiments, an application builder may configure a plurality of forms to create a whole or entire application. One or more forms may integrate with a conductor or orchestrator for RPA of related application. A tracking system may use references to track process results for one or more forms. For instance, an application studio or production may have process references. In certain configurations, an artifact may be a form, orchestrator instance, data source, user data, a data source with functions, or the like. One or more of these artifacts may form a model. In addition, a model may be sharable.

For example, the application platform creates its own "model" that represents a specific set of processes from a specific orchestrator instance. This orchestrator model (artifact) may look similar to orchestrator processes because it may store information such as process names, versions, input properties, output properties, etc. This model contains all the info the apps platform needs to start processes and read process results. This model contains dependency information that refers to a specific orchestrator and processes/robots/etc.

In certain embodiments, one or more forms may be created for an application in an environment. One or more environment variables related to the one or more forms may also be created. One or more paths to track a dependency reference between the one or more environment variables may be utilized. A data model includes the one or more paths and the one or more environment variables. The data model may be executed to recreate the dependency reference, between the one or more environment variables, for the application in a target environment.

In certain configurations, a system may determine or a range dependencies or tracking so that development tools prevent deletion of related artifacts, track dependencies, enabling development of new functionality without extra overhead, reduce code duplication, reduce data duplication, enable application reuse, or the like. With respect to deletion of artifacts, dependency or tracking of artifacts may result in reliable deletion of dependencies through better understanding of relations. This may improve user experience as complete understanding of intricacies of components or modules of the application may be unnecessary. Moreover, development tools may also assist in transferring of end user applications between environments. For instance, copying, sharing, moving, or the like an application in a marketplace or environment may be possible with dependencies of artifacts understood for deployment in various target environments. Relationships between respective artifacts may be maintained after moving the application to a new marketplace or environment.

A use case or example could be an application that consists of a plurality of forms and an orchestrator integration. When deploying this app to any new environment, it can be determined if the orchestrator instance associated with the original app is available within the new environment. It will also be possible to determine whether processes referred to by the deployed app are available within the new environment. If any dependency on external "artifacts" such as this could not be resolved in the new environment, it should be possible to automatically download/create these within the new environment, or, via user interface, enable the user to select a different orchestrator instance and/or processes that could be used in place of the missing dependencies.

This may be achieved without manual linkups by an implementer, user, developer, or the like. Erroring check or reporting may be utilized for copied or shared applications so that potential problems are identified at initial creation. Thus, copying or sharing of applications may be achieved with minimal user input.

Figure 2:
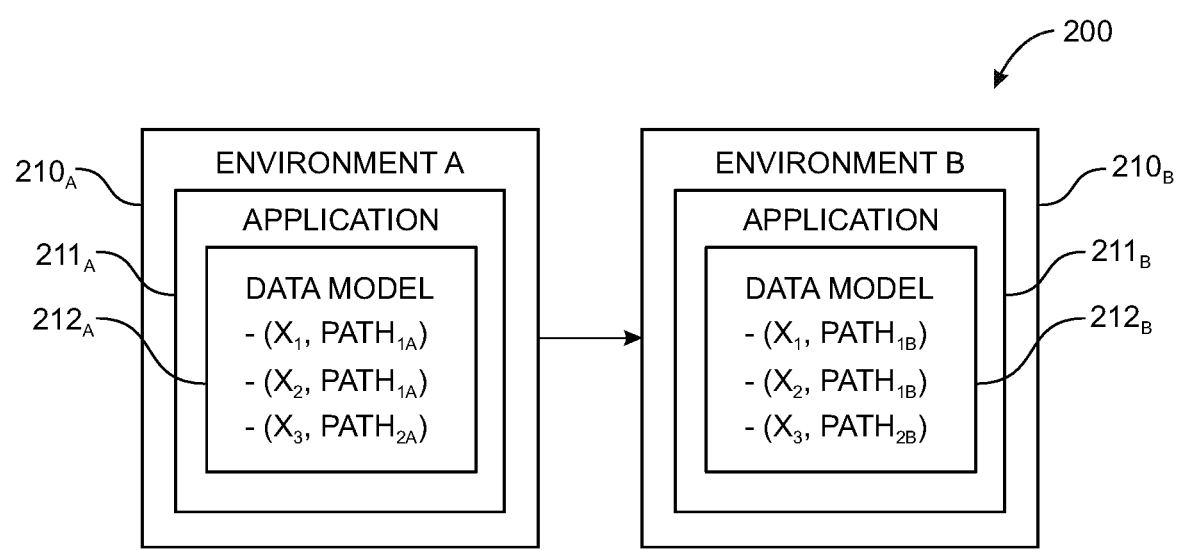
FIG. 2 is an illustration of an example of process queue management for automated robots.

In accordance with the description above, FIG. 2 is an illustration of an example of process queue management 200 for automated robots. The illustration 200 shows an environment A ($210_A$) that includes an application $211_A$ that includes a data model $212_A$ that includes a plurality of data and paths. The illustration 200 also shows an environment B ($210_B$) that includes an application $211_B$ that includes a data model $212_B$ that includes a plurality of data and paths.

Figure 3:
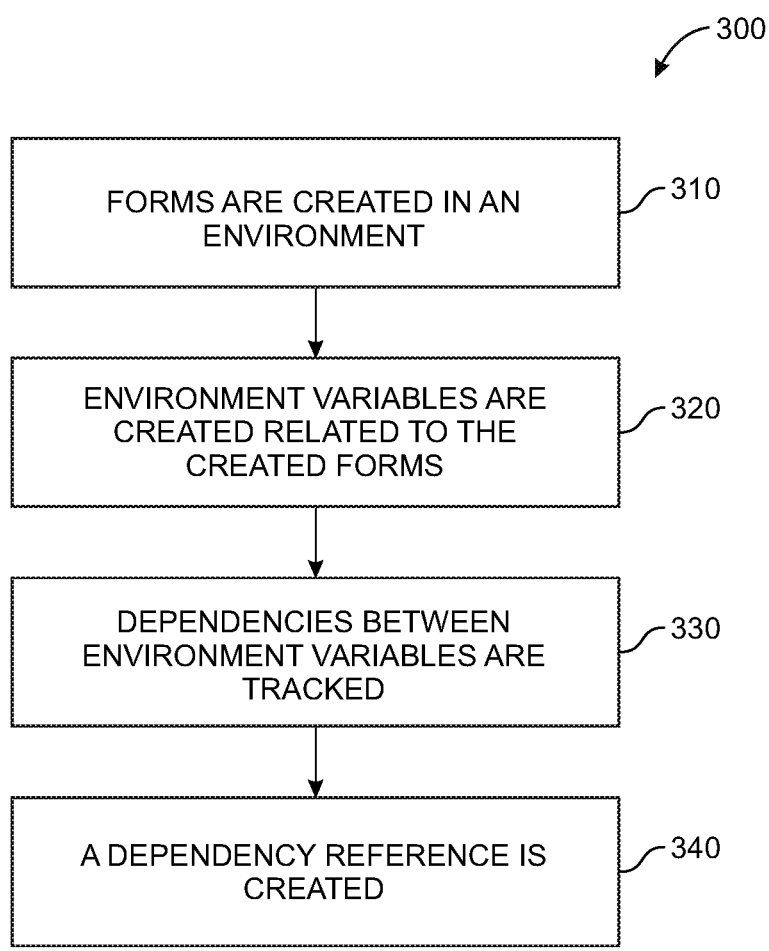
FIG. 3 is a flow diagram of an example method of artifacts reference creation and dependency tracking.

FIG. 3 is a flow diagram of an example method 300 of artifacts reference creation and dependency tracking. In accordance with the description above. In step 310, one or more forms for an application in an environment are created. Environment variables related to the created forms are created (step 320). The "environment variables" could also be any other "model" that the app comprises. For example, if one form (F1) is created, and a second form (F2) is created, and a button is placed on F1 (B1), and a rule added to that button when the user clicks on the button, and that rule is configured to "Open F2" (R1), a reference is created on F1 wherein it stores information about the fact that F2 has become an external dependency for F1 (via B1 and R1), and the same is created on F2: information is stored on F2 regarding the fact that it is being used by F1 (via B1 and R1), and it also stores all the locations in the model of F2 where it could have been referred to from F1 (B2, B3, R2, R3, F4. etc.). This means that at any point, F1 has a list of external "dependencies" (which could refer to variables, documents, other forms, orchestrator processes, etc.) including where in those models the references are used (B1 R1, B2 R3, B3 R3 . . . ), as well as a list of all external models (other apps/forms/etc.) that references itself (F1). This is a two way dependency tracking system that enables the packaging of apps and deployment to other environments, including all of its dependencies.

One or more paths are utilized to track a dependency reference between the one or more environment variables (step 330), and a data model includes the one or more paths and the one or more environment variables. A dependency reference is created in step 340. A data model may be used to recreate the dependency reference, between the one or more environment variables, for the application in a target environment.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device comprising:
    a processor and a memory configured to create one or more forms for an application in an environment;
    the processor and the memory are further configured to create one or more environment variables related to the one or more forms;
    the processor is further configured to utilize one or more paths to track a dependency reference between the one or more environment variables, wherein a data model includes the one or more paths and the one or more environment variables, wherein an artifact is deleted based upon the dependency reference; and
    the processor is further configured to execute the data model to recreate the dependency reference, between the one or more environment variables, for the application in a target environment.

2. The computing device of claim 1 wherein the processor is further configured to generate a rule based upon an action in a first form that causes action to a second form.

3. The computing device of claim 2 wherein the processor is further configured to create a reference on the first form that the second form is an external dependency for the first form.

4. The computing device of claim 3 wherein the processor is further configured to create a reference on the second form that the second form is an external dependency for the first form.

5. The computing device of claim 4 wherein the reference information includes one of more of the following data: variables, documents, additional forms, and orchestrator processes.

6. The computing device of claim 1 wherein the processor is further configured to generate a range of dependencies for the one or more forms.

7. The computing device of claim 1 wherein the processor is further configured to determine if an orchestrator instance associated with an original application is available within a new environment.

8. The computing device of claim 7 wherein if an artifact is not available in the new environment, the processor is further configured to perform any of the following: automatically create the new artifact within the new environment, or enable a user to select, via a user interface, a different orchestrator instance for use.

9. A method comprising:
    creating, by a processor and a memory, one or more forms for an application in an environment;
    creating, by the processor, one or more environment variables related to the one or more forms;
    utilizing, by the processor, one or more paths to track a dependency reference between the one or more environment variables, wherein a data model includes the one or more paths and the one or more environment variables, wherein an artifact is deleted based upon the dependency reference; and
    executing, by the processor, the data model to recreate the dependency reference, between the one or more environment variables, for the application in a target environment.

10. The method of claim 9, further comprising generating, by the processor, a rule based upon an action in a first form that causes action to a second form.

11. The method of claim 10, further comprising creating, by the processor, a reference on the first form that the second form is an external dependency for the first form.

12. The method of claim 11, further comprising creating, by the processor, a reference on the second form that the second form is an external dependency for the first form.

13. The method of claim 12 wherein the reference information includes one of more of the following data: variables, documents, additional forms, and orchestrator processes.

14. The method of claim 9, further comprising generating, by the processor, a range of dependencies for the one or more forms.

15. The method of claim 9, further comprising determining, by the processor, if an orchestrator instance associated with an original application is available within a new environment.

16. The method of claim 15 wherein if an artifact is not available in the new environment, performing, by the processor, any of the following: automatically create the new artifact within the new environment, or enable a user to select, via a user interface, a different orchestrator instance for use.

17. A non-transitory computer-readable medium for reference creation in a computer system, the non-transitory computer-readable medium having instructions recorded thereon, that when executed by the processor, cause the processor to perform operations including:

creating one or more forms for an application in an environment;

creating one or more environment variables related to the one or more forms;

utilizing one or more paths to track a dependency reference between the one or more environment variables, wherein a data model includes the one or more paths and the one or more environment variables, wherein an artifact is deleted based upon the dependency reference; and executing the data model to recreate the dependency reference, between the one or more environment variables, for the application in a target environment.

18. The non-transitory computer-readable medium of claim 17, further comprising generating, by the processor, a rule based upon an action in a first form that causes action to a second form.

19. The non-transitory computer-readable medium of claim 18, further comprising creating, by the processor, a reference on the first form that the second form is an external dependency for the first form.

20. The non-transitory computer-readable medium of claim 19, further comprising creating, by the processor, a reference on the second form that the second form is an external dependency for the first form.

* * * * *